United States Patent
Paisley et al.

[11] Patent Number: 5,899,532
[45] Date of Patent: May 4, 1999

[54] EASY ENTRY SEAT TRACK ASSEMBLY WITH SINGLE POINT MEMORY

[75] Inventors: Thomas W. Paisley, Warren, Ill.; Mark R. Truman, Troy, Mich.

[73] Assignee: Excel Industries, Inc., Elkhart, Ind.

[21] Appl. No.: 08/944,883

[22] Filed: Oct. 6, 1997

[51] Int. Cl.⁶ .................................................... B60N 2/20
[52] U.S. Cl. ................................................................ 297/341
[58] Field of Search ............................ 297/341; 248/429, 248/430

[56] References Cited

U.S. PATENT DOCUMENTS

| | | | |
|---|---|---|---|
| 4,159,147 | 6/1979 | Kiyomitsu et al. | 297/341 |
| 4,639,038 | 1/1987 | Heling | 297/341 |
| 4,648,657 | 3/1987 | Cox et al. | 297/341 |
| 4,652,052 | 3/1987 | Hessler et al. | 297/341 |
| 4,671,571 | 6/1987 | Gionet | 297/341 |
| 4,844,542 | 7/1989 | Humer | 297/341 |
| 4,856,847 | 8/1989 | Kanai | 297/341 |
| 4,880,084 | 11/1989 | Tanaka et al. | 188/67 |
| 4,881,774 | 11/1989 | Bradley et al. | 297/341 |
| 4,909,570 | 3/1990 | Matsuhashi | 297/341 |
| 4,951,966 | 8/1990 | Nihei | 280/807 |
| 5,020,853 | 6/1991 | Babbs | 297/341 |
| 5,052,751 | 10/1991 | Hayakawa et al. | 297/341 |
| 5,100,092 | 3/1992 | Sovis | 248/429 |
| 5,352,019 | 10/1994 | Bauer et al. | 297/341 |
| 5,390,981 | 2/1995 | Griswold | 297/378.12 |
| 5,407,165 | 4/1995 | Balocke | 248/429 |
| 5,531,503 | 7/1996 | Hughes | 297/341 |
| 5,547,159 | 8/1996 | Treichl et al. | 248/429 |
| 5,567,013 | 10/1996 | Chang | 297/341 |
| 5,597,206 | 1/1997 | Ainsworth et al. | 297/378.12 |
| 5,605,377 | 2/1997 | Tame | 297/341 |
| 5,626,392 | 5/1997 | Bauer et al. | 297/341 |

*Primary Examiner*—Peter R. Brown
*Attorney, Agent, or Firm*—Banner & Witcoff, Ltd

[57] ABSTRACT

An easy entry seat track assembly with single point memory comprises a lower track assembly and an upper track assembly, slidably engaging the lower track assembly. A latch releasably secures the upper track assembly to the lower track assembly. Operation of a towel bar or the like is provided for comfort adjustment of the upper track assembly relative to the lower track assembly. Also, single point memory is provided for moving the latch from a latching position to an unlatching position, holding in the unlatching position temporarily and returning the latch to the latching position when the upper seat track is moved to a predetermined position. The single point memory comprises a cam plate mounted on the upper track assembly. A memory mechanism attached to the latch is contacted by the cam plate as it rotates from an open position to a memory position, moving the latch to the unlatching position. The cam plate is held in the memory position until the upper track slides to the predetermined position where, for example, the cam plate contacts a reset flange which returns the cam plate to the open position.

19 Claims, 7 Drawing Sheets

EASY ENTRY SEAT TRACK ASSEMBLY WITH SINGLE POINT MEMORY

FIELD OF THE INVENTION

The present invention generally relates to an improved seat track assembly having a memory feature, which causes a seat when returned after being moved from an initial position to re-latch at a predetermined position.

BACKGROUND OF THE INVENTION

Seat track assemblies are commonly used for forward and rearward comfort adjustment of seats, particularly seats in motor vehicles. Such seats normally have a seat base and a seat back, with the seat back pivotably connected to the seat base by a recliner. Upper seat tracks are slidable over lower seat tracks, and are secured together by a latch assembly. When such seats are positioned, for example, in the front row of a 2-door vehicle, it can be desirable to be able to move the seats forward to allow access to a back row of the motor vehicle. Easy entry, as that term is used by those skilled in the art, refers to a seat mounted on a seat track assembly in which the upper seat tracks can be readily unlatched from the lower tracks and the seat slid forward, allowing greater access to the back row.

Memory, as that term is used by those skilled in the art of seat track assemblies, refers to a seat track assembly having a system in which the seat returns to a preselected position. In single point memory systems the seat re-latches when returned to one particular position preselected by the manufacturer. Known single point memory designs greatly increase the cost and complexity of seat track assemblies. It would be desirable to have a low cost memory feature having fewer components and greater reliability.

In view of the foregoing, it is an object of the present invention to provide a seat track assembly having single point memory with reduced cost, complexity and enhanced manufacturability. It is yet another related object of the present invention to provide an easy entry seat track assembly with single point memory that is highly reliable in operation.

SUMMARY OF THE INVENTION

In accordance with these and other objects, there is provided a seat track assembly having single point memory comprising a fixed lower track assembly having a lower track, an upper track assembly having an upper track slidable over the lower track, a latch movable from a latching position to an unlatching position, for releasably securing the upper track to the lower track, and a single point memory for moving the latch from the latching position to the unlatching position, for holding the latch in the unlatching position and for returning the latch to the latching position when the upper track is returned to a position predetermined by the manufacturer, for example, a full rearward position. The single point memory disclosed herein is of elegantly simple construction, comprising a cam plate mounted on the upper track assembly, rotatable from an open position to a memory position, and a memory mechanism attached to the latch. As the cam plate rotates to the memory position the cam plate urges the memory mechanism to move the latch from the latching position to the unlatching position, allowing the upper track to slide over the lower track. The cam plate is held in the memory position until the upper track slides to the predetermined position. At such predetermined position the cam plate contacts a reset flange which returns the cam plate to the open position. The latch is the free to move under the force of a biasing spring toward the latching position.

Typically a pair of upper and lower seat tracks serve as a slidable mount for a seat having a seat back and a seat base connected by a pivotable recliner. For easy entry, the seat back is dumped, that is, a seat back latch allows the seat back to pivot with respect to the seat back to a full-down position. A cable may be attached near one end to the recliner, and near the other end to the cam plate such that motion of the seat back to the full-down position places tension on the cable which pulls the cam plate to the memory position to initiate easy entry. A friction force may be used to hold the cam plate in the memory position.

From the foregoing disclosure and the following more detailed description of various preferred embodiments it will be apparent to those skilled in the art that the present invention provides a significant advance in the technology and art of seat track assemblies with single point memory. Particularly significant in this regard is the potential the invention affords for complexity reduction, for enhanced manufacucturability and reliability, and for low cost. Additional features and advantages of various preferred embodiments will be better understood in view of the detailed description provided below.

It should be understood that the appended drawings are not necessarily to scale, presenting a somewhat simplified representation of various preferred features illustrative of the basic principles of the invention. The specific design features of an easy entry seat track with single point memory as disclosed here, including, for example, the specific dimensions of the cam plate and the memory mechanism, will be determined in part by the particular intended application and use environment. Certain features of the illustrated embodiments have been enlarged or distorted relative to others to facilitate visualization and clear understanding. In particular, thin features may be thickened, for clarity of illustration. All references to direction and position, unless otherwise indicated, refer to the orientation of the seat track assembly illustrated in the drawings. In general, forward and rearward refers to left and right directions, respectively, in the plane of the paper in the side view of FIG. 2, and up, down or vertical refers to corresponding up, down and vertical directions in the plane of the paper in FIG. 2.

DETAILED DESCRIPTION OF CERTAIN PREFERRED EMBODIMENTS

It will be apparent to those skilled in the art, that is, to those who have knowledge or experience in this area of technology, that many design variations are possible for the easy entry seat track assembly with single point memory disclosed herein. The following detailed discussion of various alternative and preferred features and embodiments will illustrate the general principles of the invention with reference to an easy entry seat track assembly with single point memory used in a motor vehicle seat, although the principles of the invention will be applicable to seats used elsewhere.

Referring now to the drawings, FIGS. 1–4D show a motor vehicle seat 100 having a seat back 15 pivotally connected by recliners 17 to a seat base 16. Operation of a customary seat back latch unlocks the recliners and allows the seat back to be rotated or "dumped" to a full down position. The seat 100 further comprises a seat track assembly 19 having a pair of lower seat track assemblies 20 each comprising a lower track 21, and a pair of upper seat track assemblies 30 each having an upper track 31 slidable over the lower track between full forward and full rearward positions. The seat track assemblies are preferably spaced apart to form left and right pairs aligned parallel with one another. Each lower seat track assembly preferably has front and rear risers 25, 26, for mounting to a floor pan (not shown) of a motor vehicle. Each upper track assembly may have an upper riser 32 which the seat base 16 may be mounted to. For securing the upper tracks to their corresponding lower tracks, each lower seat track 21 may have a series of teeth 22 extending from a downward flange 23. A latch 35 has a latch lever 39 with typically at least two latch windows 38 which receive the teeth 22 to restrict forward and rearward motion of the upper seat track with respect to the lower track when the latch is in a latching position. The latch lever 39 is preferably pivotable between the latching position and an unlatching position, and is biased toward the latching position by a latch spring 36. The latch also can comprise a towel bar 27 or other suitable mechanism for comfort adjustment of the seat track assemblies and connection of the latch levers so that they operate substantially simultaneously.

Figure 1:
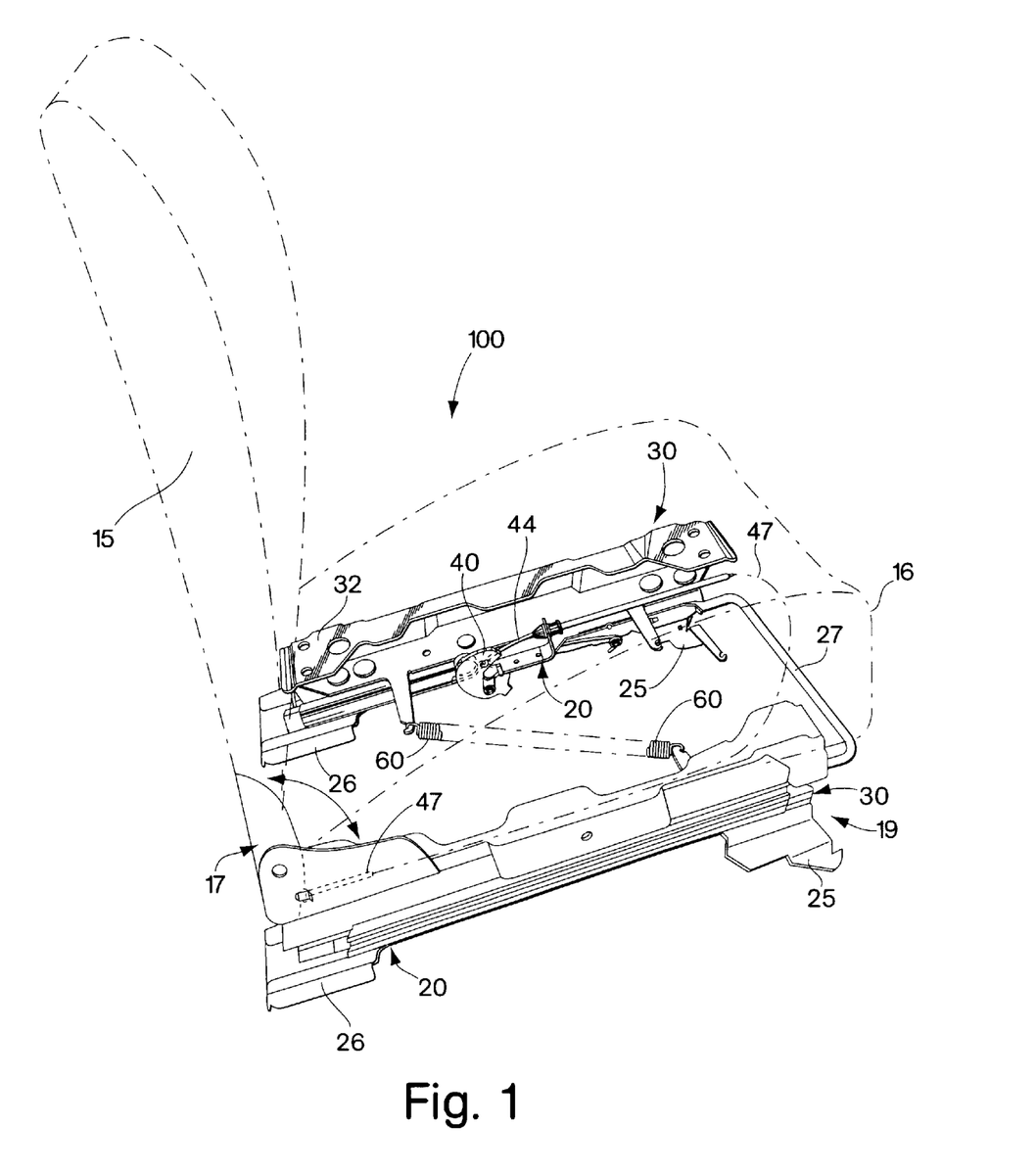
FIG. 1 is a perspective view of a seat track assembly with single point memory in accordance with a preferred embodiment.
Figure 2:
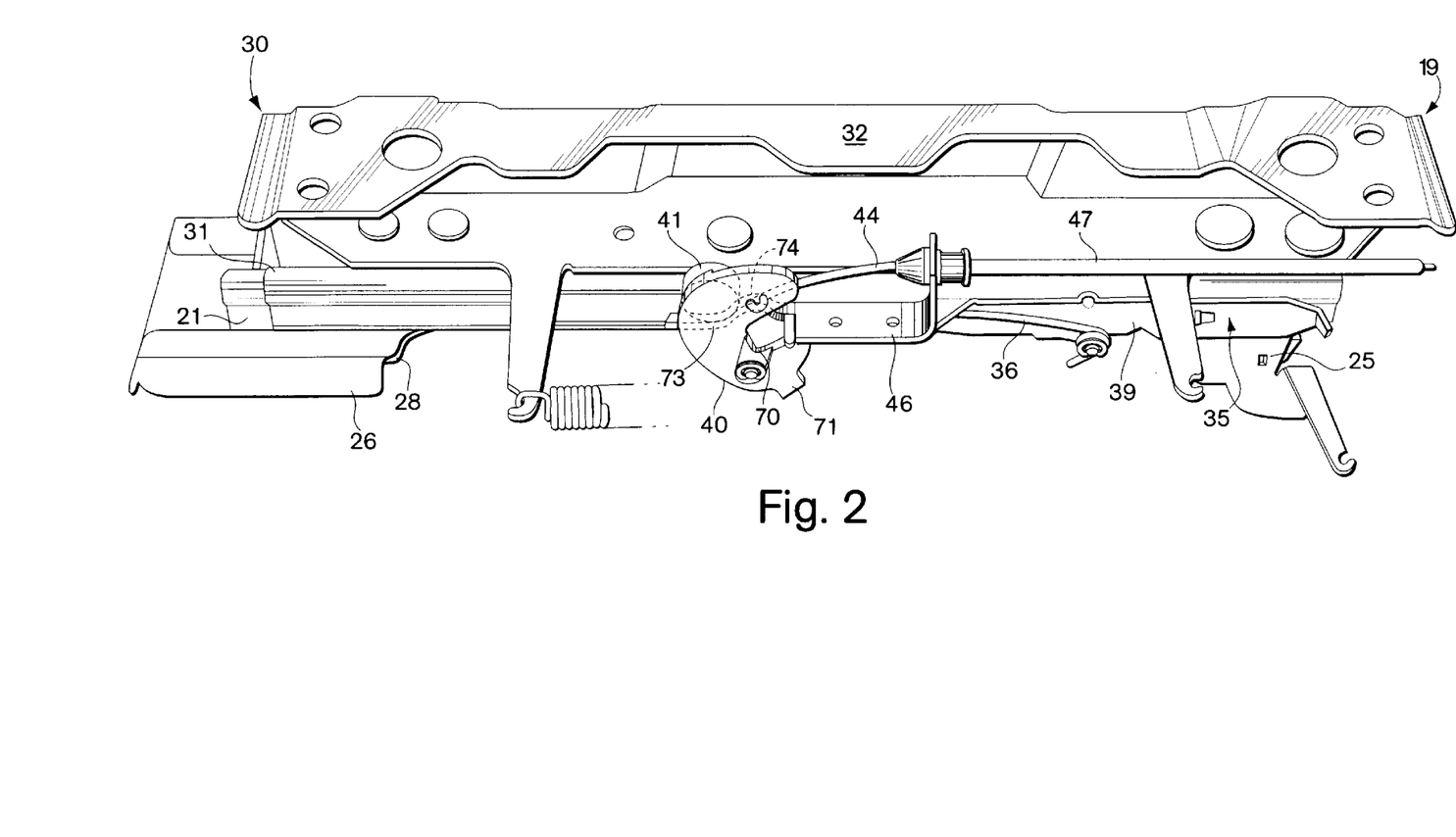
FIG. 2 is a perspective view of the preferred embodiment of FIG. 1 showing the latch in a latching or locking position.
Figure 3:
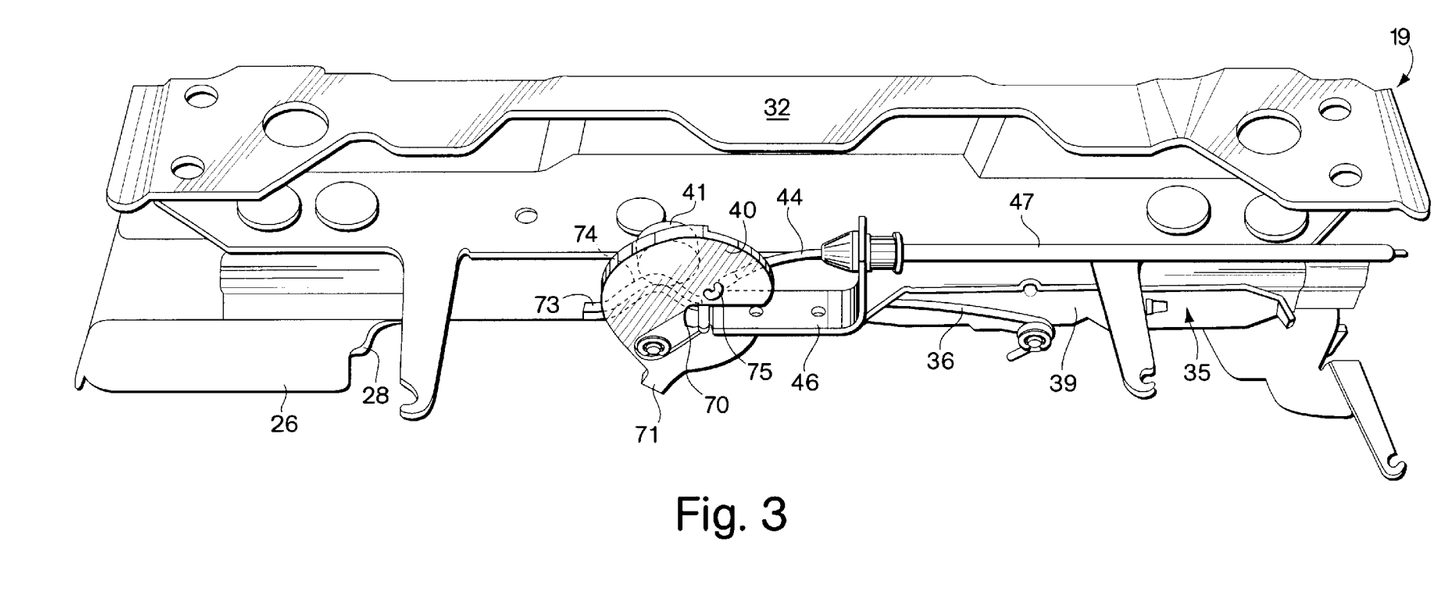
FIG. 3 is a perspective view of the seat track assembly where the cam plate has been rotated to a memory position so as to engage the memory mechanism and disengage the latch.

FIGS. 1–4 show a first preferred embodiment of the invention. FIGS. 2–4 focus on one pair of seat tracks showing the single point memory. It should be understood that both left and right pairs of seat tracks can have preferably substantially mirror image single point memory to provide even transmission of loading and substantially simultaneous motion of the seat track assembly. In FIG. 2 the latch 35 is in a latching or locking position so that the upper track cannot slide over the lower track. Operation of the towel bar 27 allows for comfort adjustment of the vehicle seat as described above. The single point memory device is not engaged and therefore the latch would return to the latching position after the towel bar is released.

Figure 4A:
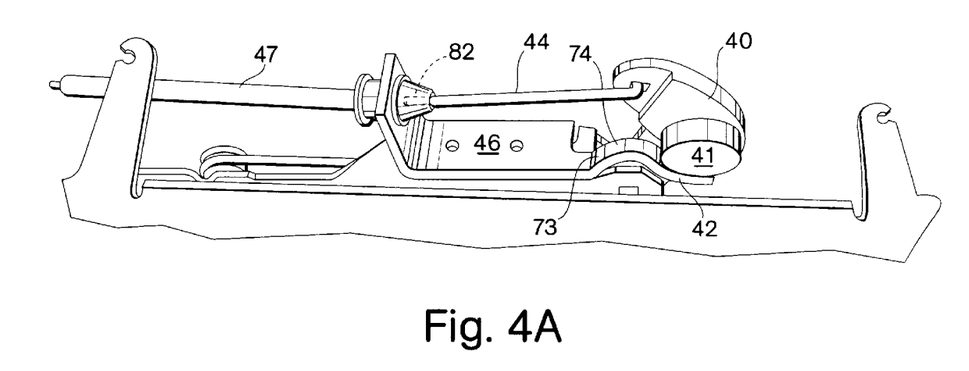
FIG. 4A is a perspective view with the upper and lower tracks removed for clarity of illustration, showing the cam plate in a normal open position.
Figure 4B:
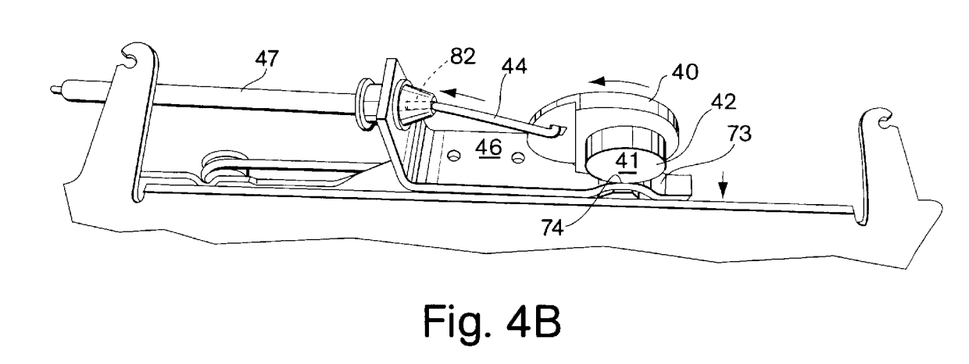
FIG. 4B shows the cam plate rotated to a memory position, urging the latch into the unlatching position.
Figure 4C:
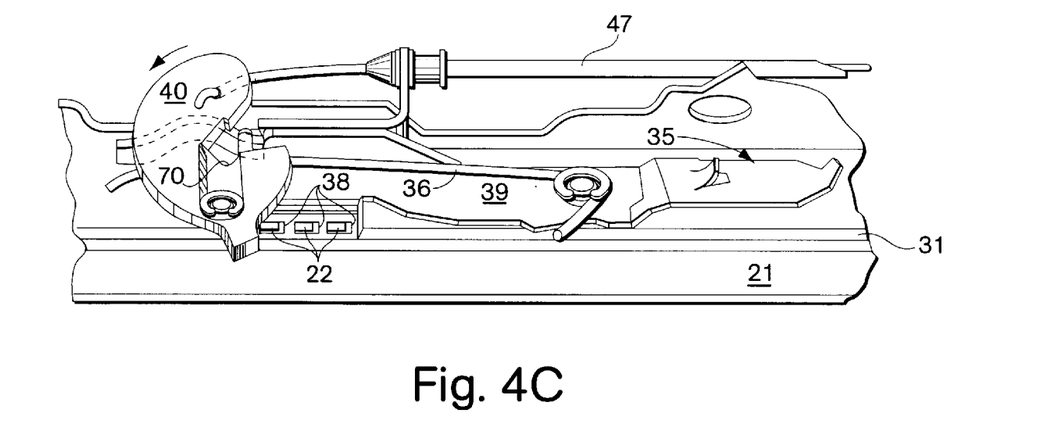
FIG. 4C is a perpsective, partially cut-away view of the seat track assembly in a latching position, showing the latch windows engaging the latch teeth.
Figure 4D:
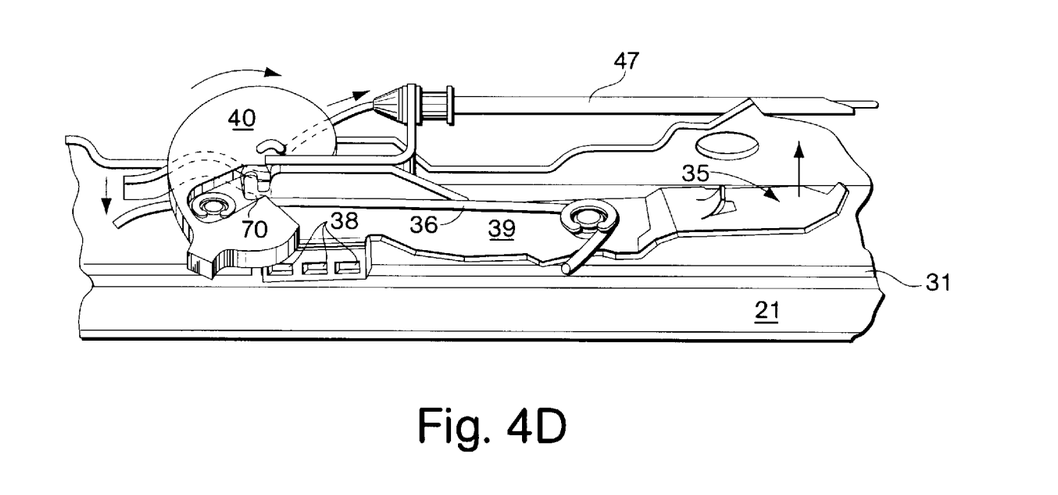
FIG. 4D is a perspective, partially cut-away view of the sat track assembly in an unlatching position.
Figure 5:
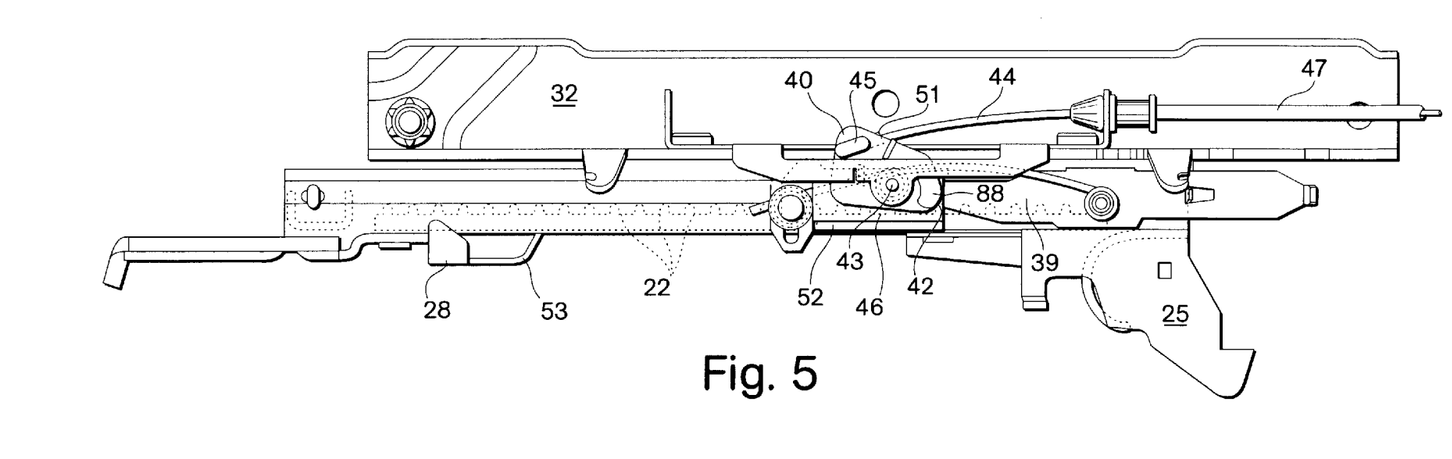
FIG. 5 is a side view of an alternative preferred embodiment shown in the latching position.
Figure 6:
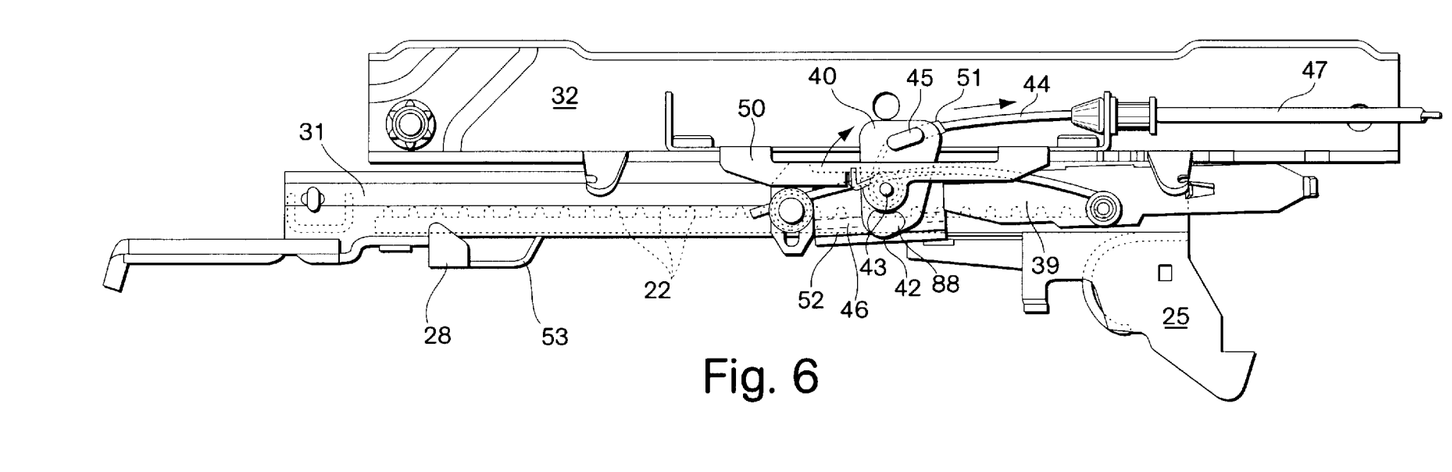
FIG. 6 is a side view of the preferred embodiment of FIG. 5 shown where the cam plate has been moved to disengage the latch.
Figure 7:
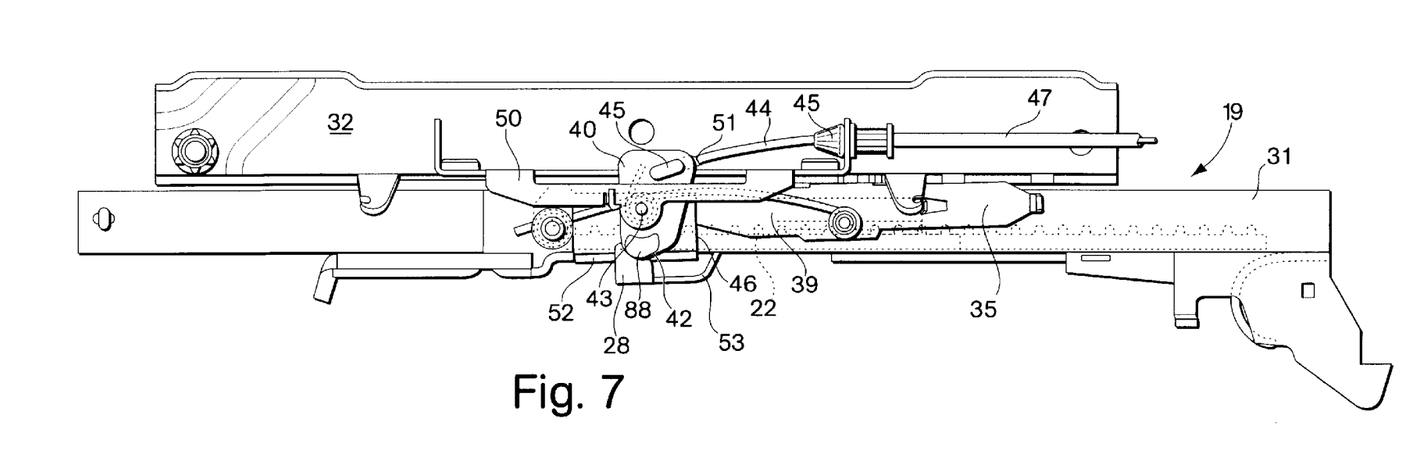
FIG. 7 is a side view of the preferred embodiment of FIG. 5 showing the upper track slid to a predetermined position where the cam plate has just contacted the reset flange.

A cable 44 sheathed by a conduit 47 connects each recliner to a cam plate 40 at anchor opening 75. In FIG. 3, the seat back has been dumped forward, that is, pivoted to a full-down position. This action engages the single point memory device. The cable 44 is pulled by movement of the recliner and so causes the cam plate 40 to rotate from an open position to a memory position. The cam plate 40 is pivotably mounted on the upper track and has a projection 41 having a cam surface 42. A slot 70 in the cam plate allows the cam to be positioned near the master latch. As the cam plate rotates to the memory position the cam surface 42 contacts a lobe 73 of a bracket 46. The bracket is riveted, welded or otherwise fixedly attached to the master latch. The cable 44 may be routed through a cable routing opening 82 to align the cable so that the cable pulls on the cam plate in substantially the same plane as the cam plate rotates. Rotation of the cam plate urges the lobe 73 to move, which in turn overcomes the force of the master latch spring to move the master latch into the unlatching position. The cam plate is held in the memory position by a friction force between the lobe 73 and the cam surface 42. FIGS. 4C and 4D show the latch lever pivoted from the latching position to the unlatching position. The maximum amount of disengagement of the latch windows 38 from the latch teeth 22 occurs once the cam surface 42 has moved to an apex 74 of the lobe.

When the cam plate 40 is in the memory position, it holds the latch in the unlatched position (with teeth 22 not engaging windows 38 of the latch) such that the upper seat track 31 is free to slide over the lower track 21. Typically an assist spring 60 connecting the lower track assembly to the upper track assembly urges the upper track towards the full forward position. Thus in a motor vehicle, the seat back can be dumped, disengaging the latch, and the seat base 16, upper tracks 31 and upper risers 32 slide forward to allow easy entrance into a rear area of the motor vehicle. In accordance with the single point memory disclosed herein, once access has been gained, the seat back may be returned to a full-up position and the upper track assembly may be slid back to a predetermined position, for example, the full rearward position. At the predetermined position a reset tab 71 on the cam plate 40 contacts a reset flange 28, shown in FIG. 2 as part of the lower rear riser 26. The reset flange 28 urges the cam surface 42 to rotate back down the lobe 73 of the bracket 46, allowing the cam plate to return to the open position and allowing the latch to return to the latching position.

FIGS. 5–8 show an alternative preferred embodiment of a seat track assembly having a single point memory. Analogous features of this preferred embodiment generally have the same numbering as features in the first preferred embodiment. Cam plate 40 is pivotably mounted on a cam pivot pin 43 at an easy entry bracket 50. The easy entry bracket is attached to the upper track assembly at, for example, the upper riser 32, and has a cable routing opening 45 for routing the cable 44 toward the cam plate 40. As in the first embodiment dumping the seat back forces the cable to pull the cam plate from an open position (FIG. 5) where the single point memory does not interfere with comfort adjustment, to a memory position (FIG. 6) which prevents the latch from returning to the latching position until the upper track slides over the lower track to a predetermined position. The cam plate has a cam surface 42 which contacts a shelf 52 of a bracket 46 affixed to the latch lever 39 to urge the latch to the unlatching position. The cam plate may have a cam plate bias spring 51 mounted on the easy entry bracket 50 which biases the cam plate toward the open position. The cam plate 40 is held in the memory position by a friction force between the cam surface 42 and the shelf 52 which exceeds the force of the cam plate bias spring 51.

Figure 8:
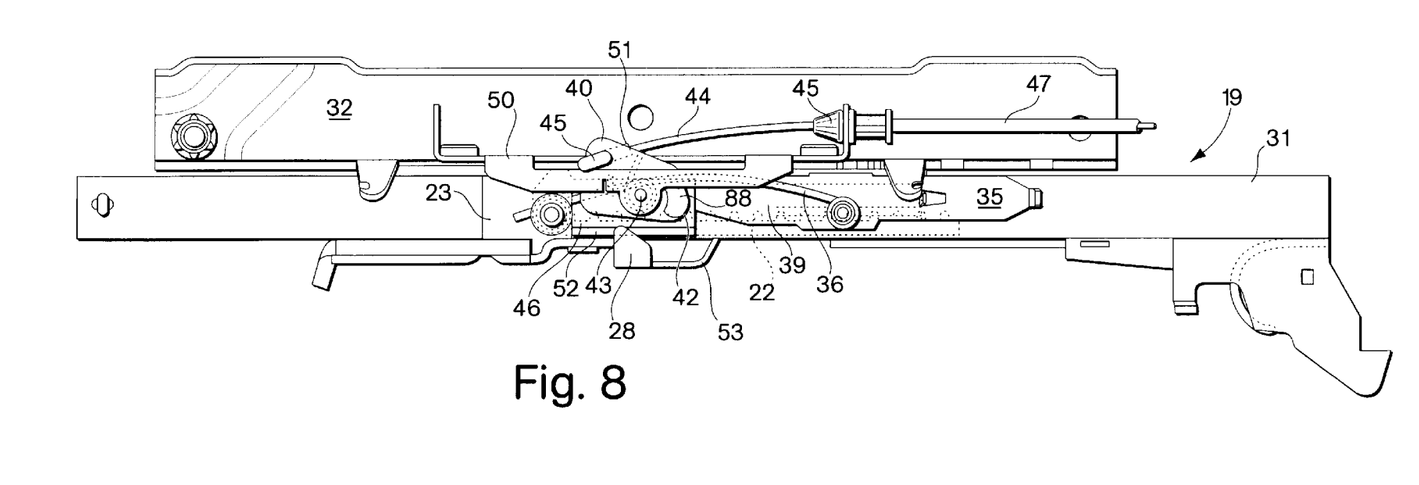
FIG. 8 is a side view of the preferred embodiment of FIG. 5 wherein the cam plate has disengaged the bracket and has returned to the latching position.

FIG. 8 shows the cam plate projection 88 contacting a reset flange 28 of a reset bracket 53 which can be attached to the lower track assembly. The reset flange overcomes the force of friction between the shelf 52 and the cam surface 42 and returns the cam plate to the open position, which allows the latch to return to the latching position, securing the upper seat track to the lower seat track, much as in the previous embodiment. The latch assembly can then be used in the ordinary way for fore and aft comfort adjustment.

The seat track assembly embodiments with single point memory shown in the drawings have the cable 44 pulling the cam plate in a forward direction. It will be readily apparent to those skilled in the art that the cable may pull the cam plate in a rearward direction and accomplish the same result merely by locating a cable attachment at a different location on the cam plate.

From the foregoing disclosure and detailed description of certain preferred embodiments, it will be apparent that various modifications, additions and other alternative embodiments are possible without departing from the true scope and spirit of the invention. For example, easy entry seat tracks with single point memory may also have additional mechanisms controlling the tilt of the seat base, or the cam plate may be positioned so as to rotate from the open position to the memory position in the direction opposite that shown in the drawings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A seat track assembly comprising, in combination:
    a lower track assembly comprising a lower track;
    an upper track assembly, operably engaging the lower track assembly and comprising an upper track slidable between a full forward position and a full rearward position over the lower track;
    a latch movable from a latching position to an unlatching position, releasably securing the upper track to the lower track in the latching position; and
    memory means for moving the latch to the unlatching position and for returning the latch to the latching position when the upper track is moved to a predetermined position relative to the lower track assembly, comprising:
        a cam plate mounted on the upper track assembly, and a cable attached to the cam plate, wherein tension on the cable pulls the cam plate from an open position to a memory position,
        a memory mechanism operatively interconnecting the cam plate to the latch so that rotation of the cam plate to the memory position urges the latch from the latching position to the unlatching position, allowing the upper track to slide over the lower track,
        wherein the cam plate is held in the memory position until the upper track moves to the predetermined position, and
        means for returning the cam plate to the open position, comprising a reset flange on the lower track assembly which urges the cam plate to return from the memory position to the open position when the upper seat track is returned to the predetermined position.

2. The seat track assembly of claim 1 wherein the reset flange is mounted on the lower track assembly.

3. The seat track assembly of claim 1 wherein the cam plate has a reset tab which contacts the reset flange when the upper track is moved to the predetermined position.

4. The seat track assembly of claim 1 further comprising a spring mounted on the upper track biasing the latch toward the latching position.

5. The seat track assembly of claim 1 wherein the predetermined position is a full rearward position.

6. The seat track assembly of claim 1 further comprising latch teeth on the lower track and latch windows on the latch which engage the latch teeth when the latch is in the latching position.

7. The seat track assembly of claim 1 wherein the memory mechanism comprises a bracket attached to the latch, and the cam plate moves against the bracket as the cam plate moves from the open position to the memory position.

8. The seat track assembly of claim 7 wherein the bracket has a lobe, and the cam plate has a cam surface which moves over the lobe as the cam plate moves to the memory position, forcing the latch to move from the latching position to the unlatching position.

9. The seat track assembly of claim 8 wherein the cam plate is held in the open position by a friction force between the lobe and the cam surface.

10. The seat track assembly of claim 7 wherein the bracket has a cable routing opening, and the cable is slidably connected to the bracket through the opening.

11. The seat track assembly of claim 7 wherein the bracket has a shelf, and the cam plate contacts the shelf as the cam plate rotates from the open position to the memory position.

12. The seat track assembly of claim 7 further comprising an easy entry bracket mounted on the upper track assembly and the cam plate is rotatably mounted on the easy entry bracket.

13. The seat track assembly of claim 12 further comprising a cam plate spring mounted on the easy entry bracket, producing a force biasing the cam plate toward the open position.

14. The seat track assembly of claim 13 wherein the cam plate is held in the memory position by a friction force between the cam plate and the bracket, and the friction force exceeds the force of the cam plate bias spring.

15. An easy entry seat track assembly having single point memory, comprising, in combination:
    a lower track assembly having a pair of lower tracks, each lower track having rigidly attached front and rear lower risers for attachment to a motor vehicle floor pan;
    an upper track assembly comprising a pair of upper tracks, slidable in forward and rearward directions over corresponding lower tracks, each upper track having a rigidly attached upper riser;
    a latch having a pair of latch levers each releasably securing a corresponding upper track to a corresponding lower track in a latching position, and each latch lever being biased toward the latching position by a corresponding latch spring;
    single point memory for moving each latch lever to an unlatching position and for returning each latch lever to the latching position when the upper track assembly is at a predetermined position, comprising:
        a cam plate mounted on the upper track assembly,
        a cable operatively connected to the cam plate, wherein tension on the cable urges the cam plate to rotate from an open position to a memory position,
        a bracket operatively interconnecting the cam plate to the latch lever so that rotation of the cam plate to the memory position moves the latch lever from the latching position to the unlatching position, allowing the upper track to slide over the lower track, a friction force between the cam plate and the bracket sufficient to hold the cam plate in the memory position, and a reset flange mounted on the lower track assembly, to contact the cam plate when the upper track moves to the predetermined position, to overcome the friction force holding the cam plate in the memory position, whereby the cam plate returns to the open position.

16. The easy entry seat assembly of claim 15 further comprising latch teeth on each lower track which are engaged by corresponding latch windows on the latch levers when the latch is in the latching position.

17. The easy entry seat assembly of claim 16 further comprising a towel bar connecting the latch levers so that each lever moves from the latching position to the unlatching position substantially simultaneously.

18. The easy entry seat assembly of claim 15 further comprising an assist spring connecting the lower track assembly to the upper track assembly, biasing the upper track assembly toward a full forward position.

19. The easy entry seat assembly of claim 15 further comprising:

a seat base mounted on the upper risers;

a seat back; and a pair of recliners affixed to the seat base and to the seat back, wherein the seat back is pivotable with respect to the seat base from a full-up position to a full-down position, each recliner being operatively connected to the corresponding cable;

wherein rotation of the seat back to the full-down position pulls the cable toward the recliner, moving the cam plate from the open position to the memory position.

* * * * *